(12) United States Patent
Carmi (10) Patent No.: US 12,100,115 B2
(45) Date of Patent: Sep. 24, 2024

(54) SYSTEM AND METHOD FOR COHESIVE MULTI-REGIONAL FUNCTIONAL-ANATOMICAL MEDICAL IMAGE REGISTRATION

(71) Applicant: GE PRECISION HEALTHCARE LLC, Wauwatosa, WI (US)

(72) Inventor: Raz Carmi, Haifa (IL)

(73) Assignee: GE Precision Healthcare LLC, Wauwatosa, WI (US)

( * ) Notice: Subject to any disclaimer, the term of this patent is extended or adjusted under 35 U.S.C. 154(b) by 389 days.

(21) Appl. No.: 17/398,549

(22) Filed: Aug. 10, 2021

(65) Prior Publication Data
US 2023/0049430 A1    Feb. 16, 2023

(51) Int. Cl.
*G06T 3/153*    (2024.01)
*G06T 3/14*    (2024.01)
(Continued)

(52) U.S. Cl.
CPC ............... *G06T 3/153* (2024.01); *G06T 3/14* (2024.01); *G06T 3/147* (2024.01); *G06T 7/11* (2017.01);
(Continued)

(58) Field of Classification Search
None
See application file for complete search history.

(56) References Cited

U.S. PATENT DOCUMENTS

| 2008/0232714 A1* | 9/2008 | Nord | G06T 7/33 |
| | | | 382/284 |
| 2010/0295848 A1* | 11/2010 | Grewer | G06T 7/11 |
| | | | 382/128 |

(Continued)

FOREIGN PATENT DOCUMENTS

CN    112995715 A  *  6/2021  ............... G06N 3/08

OTHER PUBLICATIONS

Zhuang, Xiahai, et al.; "A Nonrigid Registration Framework Using Spatially Encoded Mutual Information and Free-Form Deformations", IEEE Transactions on Medical Imaging, vol. 30, No. 10, Oct. 2011, pp. 1819-1828.

(Continued)

*Primary Examiner* — Emily C Terrell
*Assistant Examiner* — Nathan J Bloom
(74) *Attorney, Agent, or Firm* — Fletcher Yoder P.C.

(57) ABSTRACT

A method includes applying both a first dedicated functional-anatomical registration scheme to a first volume of interest to deform the first volume of interest and a second dedicated functional-anatomical registration scheme to a second volume of interest to deform the second volume of interest, wherein the first volume of interest at least partially encompasses the second volume of interest. The method includes identifying or segmenting relevant organs or anatomical structures related to a first group and a second group in the first volume of interest and the second volume of interest, respectively; generating a spatially smooth-transition weight mask that gives higher weight to image data (Continued)

corresponding to the identified or segmented relevant organs or anatomical structures related to the first group and the second group; and generating a final cohesive registered image volume from the first image volume and the second image volume utilizing the spatially smooth-transition weight mask.

18 Claims, 8 Drawing Sheets

(51) Int. Cl.
    *G06T 3/147*    (2024.01)
    *G06T 7/11*    (2017.01)
    *G06T 7/30*    (2017.01)
    *G06T 7/38*    (2017.01)

(52) U.S. Cl.
    CPC .................. *G06T 7/30* (2017.01); *G06T 7/38* (2017.01); *G06T 2207/10081* (2013.01); *G06T 2207/10088* (2013.01); *G06T 2207/10104* (2013.01); *G06T 2207/10108* (2013.01); *G06T 2207/30004* (2013.01); *G06T 2207/30008* (2013.01); *G06T 2207/30056* (2013.01)

(56) References Cited

U.S. PATENT DOCUMENTS

| | | | |
|---|---|---|---|
| 2012/0314923 A1* | 12/2012 | Barnhorst | A61B 34/25 382/128 |
| 2013/0039550 A1* | 2/2013 | Blum | G06T 7/0014 382/128 |
| 2014/0226889 A1* | 8/2014 | Liu | G06T 7/174 382/131 |
| 2016/0191887 A1* | 6/2016 | Casas | A61B 34/20 348/47 |
| 2019/0251694 A1* | 8/2019 | Han | G06T 7/174 |
| 2020/0184660 A1* | 6/2020 | Shi | G06T 7/30 |
| 2020/0380681 A1* | 12/2020 | Park | G06T 7/149 |
| 2023/0046321 A1* | 2/2023 | Vilsmeier | G06T 7/136 |

OTHER PUBLICATIONS

Fernandez-De-Maniel, L., et al.; "Organ-Focused Mutual Information for Nonrigid Multimodal Registration of Liver CT and Gd-EOB-DTPA-Enhanced MRI". DOI:10.1016/j.media.2013.09.002, published 2014, pp. 1-14.

Alam, Fakhre, et al.; "Challenges and Solutions in Multimodal Medical Image Subregion Detection and Registration", Journal of Medical Imaging and Radiation Sciences 50 (2019) 24-30.

Chen, Xiang, et al.; "Deep Learning in Medical Image Registration", Prog. Biomed. Eng. 3 (2021), pp. 1-28.

\* cited by examiner

SYSTEM AND METHOD FOR COHESIVE MULTI-REGIONAL FUNCTIONAL-ANATOMICAL MEDICAL IMAGE REGISTRATION

BACKGROUND

The subject matter disclosed herein relates to medical imaging and, more particularly, to medical image registration.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

It may be desirable to utilize both functional image data and anatomical image data in analyzing a patient/object. Multi-modality image registration techniques are essential when utilizing multiple different imaging modalities (e.g., single photon emission computed tomography (SPECT)-computed tomography (CT), positron emission tomography (PET)-CT, PET-magnetic resonance imaging (MM), and other imaging systems). In SPECT and PET (which provide mainly functional information) the spatial registration with the corresponding anatomical data (e.g., from CT data) is important for both attenuation correction in the reconstruction process and the clinical review of images. Accurate registration can be also important for applications that depend on automatic detection and segmentation algorithms. Common sources of misregistration are patient movement, respiratory or cardiac motion, and multi-modality systems that utilize unconnected mechanical components (e.g. ultrasound or interventional guidance imagers).

Mathematical techniques and software tools exist that are utilized for multi-modality registration. For example, some of these techniques utilize algorithms based on mutual information similarity metrics and three-dimensional (3D) fully elastic deformation. However, unmet challenges still exist to achieve accurate and robust registration results. One significant obstacle is that in many situations the structural correspondence between the functional and the anatomical data is very weak. Consequently, the optimal local similarity metric and deformation model which provides the optimal registration result may be ill-defined. Additional known difficulties are the different elasticity characteristics and disconnection of nearby organs and structures. There may also be different registered-deformed image optimizations between attenuation correction, clinical diagnostic review, and automatic diagnostic applications.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for performing image registration is provided. The method includes obtaining, via a processor, a functional image volume and a corresponding anatomical image volume from a subject. The method also includes determining, via the processor, both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest. The method further includes applying, via the processor, both a first dedicated functional-anatomical registration scheme to the first volume of interest to deform the first volume of interest and a second dedicated functional-anatomical registration scheme to the second volume of interest to deform the second volume of interest. The method even further includes identifying or segmenting, via the processor, relevant organs or anatomical structures related to the first group and the second group in the first deformed volume of interest and the second deformed volume of interest, respectively. The method still further includes generating, via the processor, a spatially smooth-transition weight mask that gives higher weight to image data corresponding to the identified or segmented relevant organs or anatomical structures related to the first group and the second group. The method yet further includes generating, via the processor, a final cohesive registered image volume from the first deformed image volume of interest and the second deformed image volume of interest utilizing the spatially smooth-transition weight mask.

In another embodiment, a system for cohesive multi-regional functional-anatomical medical image registration is provided. The system includes a memory encoding processor-executable routines. The system also includes a processor configured to access the memory and to execute the processor-executable routines, wherein the routines, when executed by the processor, cause the processor to perform actions. The actions include obtaining a functional image volume and a corresponding anatomical image volume from a subject. The actions also include determining both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest. The actions further include applying both a first dedicated functional-anatomical registration scheme to the first volume of interest to deform the first volume of interest and a second dedicated functional-anatomical registration scheme to the second volume of interest to deform the second volume of interest. The actions even further include identifying or segmenting relevant organs or anatomical structures related to the first group and the second group in the first deformed volume of interest and the second deformed volume of interest, respectively. The actions still further include generating a spatially smooth-transition weight mask that gives higher weight to image data corresponding to the identified or segmented relevant organs or anatomical structures related to the first group and the second group. The actions yet further include generating a final cohesive registered image volume from the first deformed image volume of interest and the second deformed image volume of interest utilizing the spatially smooth-transition weight mask.

In a further embodiment, a non-transitory computer-readable medium is provided. The computer-readable medium includes processor-executable code that when executed by a processor, causes the processor to perform actions. The actions include obtaining a functional image volume and a corresponding anatomical image volume from a subject. The actions also include determining both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest. The actions further include applying both a first dedicated functional-anatomical registration scheme to the first volume of interest to deform the first volume of interest and a second dedicated functional-anatomical registration scheme to the second volume of interest to deform the second volume of interest. The actions even further include identifying or segmenting relevant organs or anatomical structures related to the first group and the second group in the first deformed volume of interest and the second deformed volume of interest, respectively. The actions still further include generating a spatially smooth-transition weight mask that gives higher weight to image data corresponding to the identified or segmented relevant organs or anatomical structures related to the first group and the second group. The actions yet further include generating a final cohesive registered image volume from the first deformed image volume of interest and the second deformed image volume of interest utilizing the spatially smooth-transition weight mask.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As utilized herein, "functional medical imaging" relates to revealing physiological activities within a certain tissue or organ by employing medical image modalities (e.g., PET, SPECT, CT perfusion imaging, functional MRI) that often utilize tracers or probes to reflect spatial distribution of them within the body. As utilized herein, "anatomical medical imaging" or "structural medical imaging" relates to the visualization and analysis of anatomical properties of a certain tissue or organ utilizing certain medical image modalities (e.g., CT, structural MM, diffused-based MRI).

The present disclosure provides systems and methods for performing cohesive multi-regional functional anatomical medical image registration. In particular, the disclosed embodiments improve spatial image registration tasks between functional and medical imaging modalities (e.g., SPECT-CT, PET-CT, etc.). In a patient image volume, multiple sub-volumes are determined to include specific organs or anatomical structures of interest, which may encompass or intersect with each other. For each determined organ or anatomical structure, a specific functional-anatomical registration scheme (e.g., dedicated functional-anatomical registration scheme) is pre-defined. The respective dedicated functional-anatomical registration schemes are applied the respective sub-volumes to deform the sub-volumes. The deformed sub-volumes are merged (e.g., via an algorithm) in a smooth-transition manner (e.g., utilizing a spatially smooth-transition weight mask) to provide cohesively deformed regions with preserved deformation constraints and structural characteristics. The disclosed embodiments enable the preservation of a realistic appearance of the various anatomy and improves overall image registration accuracy.

Figure 1:
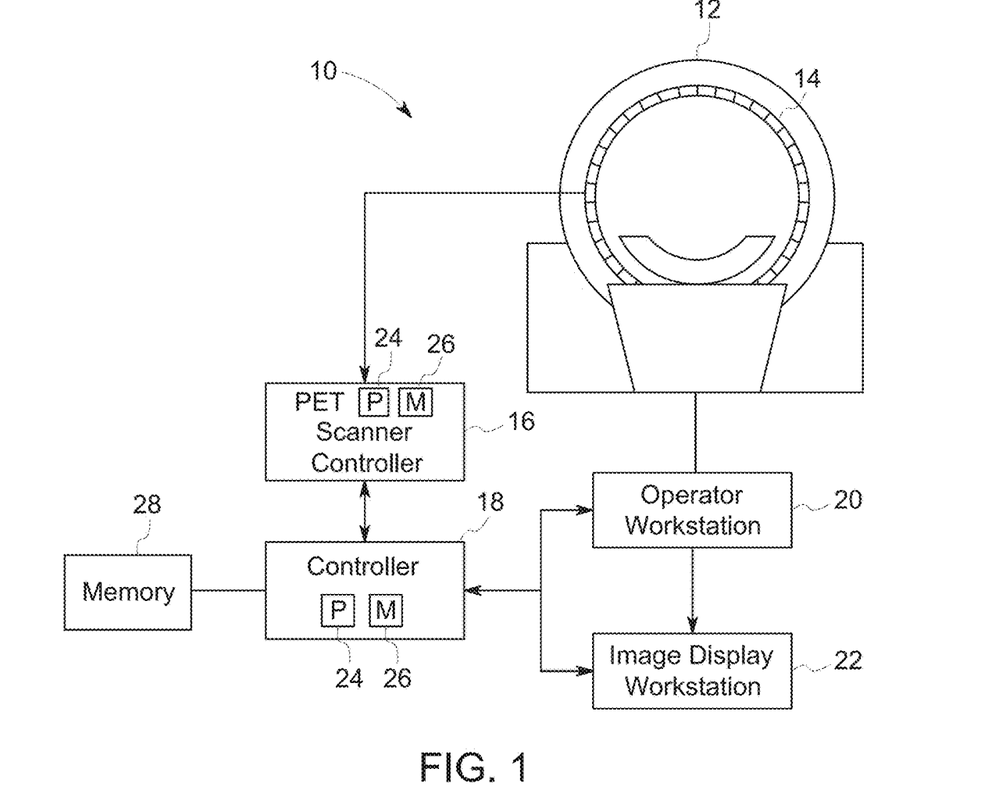
FIG. 1 is a diagrammatical representation of an embodiment of a PET imaging system in accordance with aspects of the present disclosure.

With the foregoing in mind and turning now to the drawings, FIG. 1 depicts a PET or SPECT system 10 operating in accordance with certain aspects of the present disclosure. The PET or SPECT imaging system of FIG. 1 may be utilized with a dual-modality imaging system such as a PET/CT imaging system described in FIG. 2 or a PET/MRI imaging system described in FIG. 3.

Returning now to FIG. 1, the depicted PET or SPECT system 10 includes a detector 12 (or detector array). The detector 12 of the PET or SPECT system 10 typically includes a number of detector modules or detector assemblies (generally designated by reference numeral 14) arranged in one or more rings, as depicted in FIG. 1, each detector assembly 14 includes multiple detector units (e.g., 3 to 5 detector units or more). The depicted PET or SPECT system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices.

The PET scanner controller 16, which is coupled to the detector 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET system or SPECT system 10. In certain embodiments the controller 18 and/or the workstation 20 may control the real-time operation of another imaging modality (e.g., the CT imaging system in FIG. 2) to enable the simultaneous and/or separate acquisition of image data from the different imaging modalities. One or more of the PET scanner controller 16, the controller 18, and/or the operation workstation 20 may include a processor 24 and/or memory 26. In certain embodiments, the PET or SPECT system 10 may include a separate memory 28. The detector 12, PET scanner controller 16, the controller 18, and/or the operation workstation 20 may include detector acquisition circuitry for acquiring image data from the detector 12, image reconstruction and processing circuitry for image processing, and/or circuitry for regulating the temperature of the detector units of the detector assemblies 14 (e.g., independently regulating the temperature of each detector assembly 14). The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET or SPECT system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of gamma rays. In each annihilation reaction, two gamma rays traveling in opposite directions are emitted. In a PET imaging system 10, the pair of gamma rays are detected by the detector array 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be estimated and a tumor, thereby, may be detected. Therefore, accurate detection and localization of the gamma rays forms a fundamental and foremost objective of the PET system 10.

Figure 2:
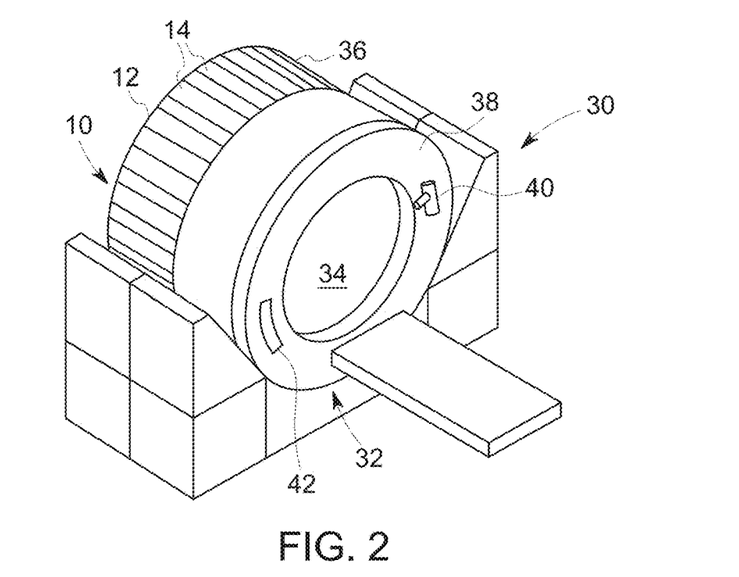
FIG. 2 is a perspective view of a PET/CT imaging system having the PET imaging system of FIG. 1.

As mentioned above, the PET or SPECT system 10 may be incorporated into a dual-modality imaging system such as the PET/CT imaging system 30 in FIG. 2. Referring now to FIG. 2, the PET/CT imaging system 30 includes the PET system 10 and a CT system 32 positioned in fixed relationship to one another. The PET system 10 and CT system 32 are aligned to allow for translation of a patient (not shown) therethrough. In use, a patient is positioned within a bore 34 of the PET/CT imaging system 30 to image a region of interest of the patient as is known in the art.

The PET system 10 includes a gantry 36 that is configured to support a full ring annular detector array 12 thereon (e.g., including the plurality of detector assemblies 14 in FIG. 1). The detector array 12 is positioned around the central opening/bore 34 and can be controlled to perform a normal "emission scan" in which positron annihilation events are counted. To this end, the detectors 14 forming array 12 generally generate intensity output signals corresponding to each annihilation photon.

The CT system 32 includes a rotatable gantry 38 having an X-ray source 40 thereon that projects a beam of X-rays toward a detector assembly 42 on the opposite side of the gantry 38. The detector assembly 42 senses the projected X-rays that pass through a patient and measures the intensity of an impinging X-ray beam and hence the attenuated beam as it passes through the patient. During a scan to acquire X-ray projection data, gantry 38 and the components mounted thereon rotate about a center of rotation. In certain embodiments, the CT system 32 may be controlled by the controller 18 and/or operator workstation 20 described in FIG. 2. In certain embodiments, the PET system 10 and the CT system 32 may share a single gantry. Image data may be acquired simultaneously and/or separately with the PET system 10 and the CT system 32.

Figure 3:
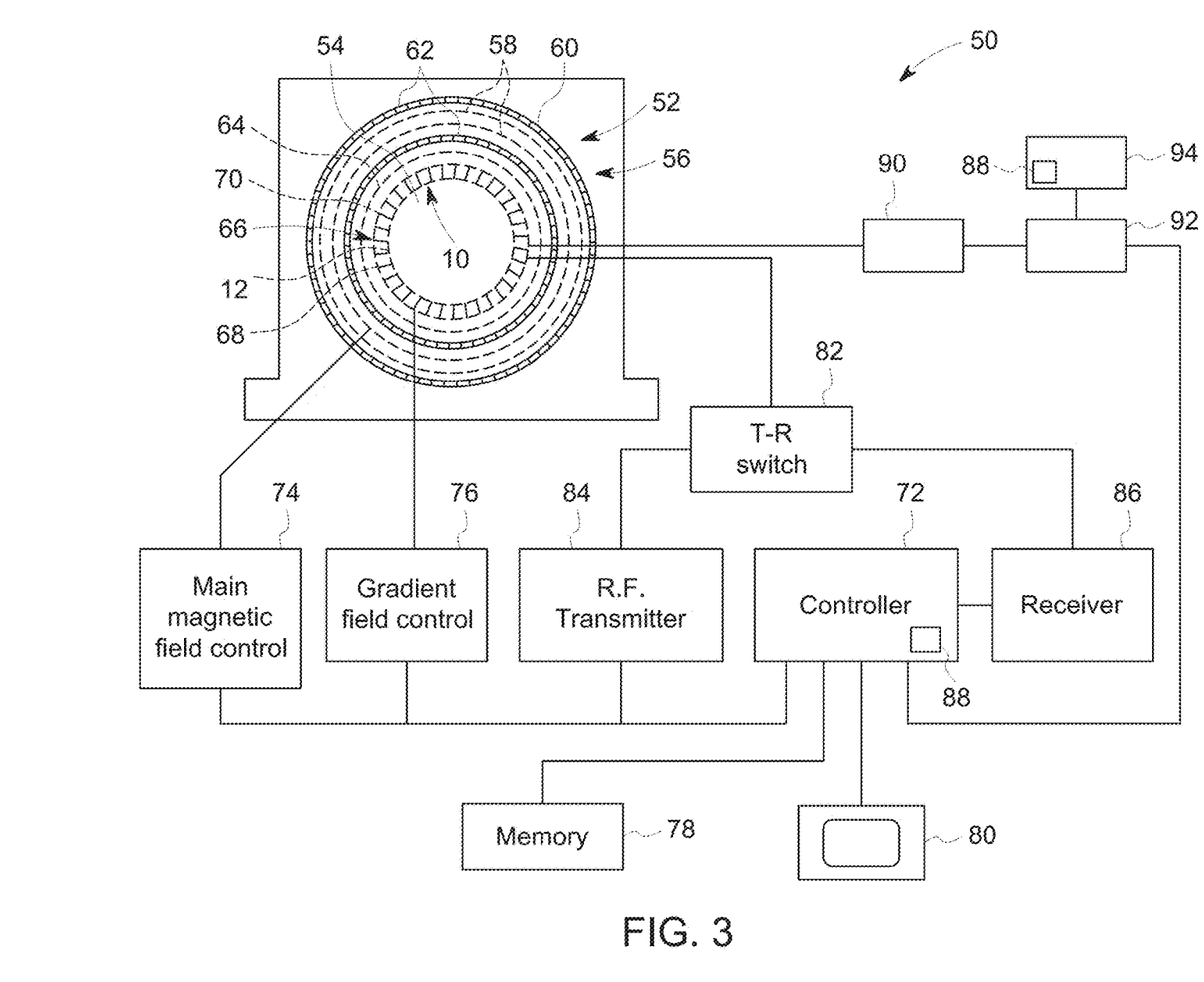
FIG. 3 is a perspective view of a PET/MRI imaging system having the PET imaging system of FIG. 1.

As mentioned above, the PET or SPECT system 10 may be incorporated into a dual-modality imaging system such as the PET/MRI imaging system 50 in FIG. 3. Referring now to FIG. 3, the PET/MRI imaging system 50 includes the PET system 10 and a MM system 52 positioned in fixed relationship to one another. The PET system 10 and MRI system 52 are aligned to allow for translation of a patient (not shown) therethrough. In use, a patient is positioned within a bore 54 of the PET/CT imaging system 50 to image a region of interest of the patient as is known in the art. Image data may be acquired simultaneously and/or separately with the PET system 10 and the MRI system 52.

The PET/MRI imaging system 50 that includes a superconducting magnet assembly 56 that includes a superconducting magnet 58. The superconducting magnet 58 is formed from a plurality of magnetic coils supported on a magnet coil support or coil former. In one embodiment, the superconducting magnet assembly 56 may also include a thermal shield 60. A vessel 62 (also referred to as a cryostat) surrounds the superconducting magnet 58, and the thermal shield 60 surrounds the vessel 62. The vessel 62 is typically filled with liquid helium to cool the coils of the superconducting magnet 58. A thermal insulation (not shown) may be provided surrounding the outer surface of the vessel 62. The imaging system 50 also includes a main gradient coil 64, and the RF coil assembly 60 described above that is mounted radially inwardly from the main gradient coil 64. As described above, a radio frequency (RF) coil assembly 66 includes the PET detector assembly 12, an RF transmit coil 68 and the RF shield 70. More specifically, the RF coil assembly 66 includes a coil support structure that is used to mount the PET detector assembly 12, the RF transmit coil 68, and the RF shield 70.

In operation, the RF coil assembly 66 enables the imaging system 50 to perform both MM and PET imaging concurrently because both the RF transmit coil 68 and the PET detector assembly 12 are placed around a patient at the center of the bore of the imaging system 50. Moreover, the PET detector assembly 12 is shielded from the RF transmit coil 68 using the RF shield 70 that is disposed between the RF transmit coil 68 and the PET detector assembly 12. Mounting the PET detector assembly 12, the RF coil 68 and the RF shield 70 on the coil support structure enables the RF coil assembly 66 to be fabricated to have an outside diameter that enables the RF coil assembly 66 to be mounted inside the gradient coil 64. Moreover, mounting the PET detector assembly 12, the RF coil 68 and the RF shield 70 on the coil support structure enables the RF coil assembly 66 to have a relatively large inside diameter to enable the imaging system 50 to image larger patients.

The imaging system 50 also generally includes a controller 72, a main magnetic field control 74, a gradient field control 76, a memory 78, a display device 80, a transmit-receive (T-R) switch 82, an RF transmitter 84, and a receiver 86.

In operation, a body of an object, such as a patient (not shown), or a phantom to be imaged, is placed in the bore 54 on a suitable support, for example, a motorized table (not shown) or the cradle described above. The superconducting magnet 58 produces a uniform and static main magnetic field $B_o$ across the bore 54. The strength of the electromagnetic field in the bore 54 and correspondingly in the patient, is controlled by the controller 72 via the main magnetic field control 74, which also controls a supply of energizing current to the superconducting magnet 58.

The main gradient coil 64, which may include one or more gradient coil elements, is provided so that a magnetic gradient can be imposed on the magnetic field B0 in the bore 54 in any one or more of three orthogonal directions x, y, and z. The main gradient coil 64 is energized by the gradient field control 76 and is also controlled by the controller 72.

The RF coil assembly 66 is arranged to transmit magnetic pulses and/or optionally simultaneously detect MR signals from the patient, if receive coil elements are also provided. The RF coil assembly 66 may be selectably interconnected to one of the RF transmitter 84 or receiver 86, respectively, by the T-R switch 82. The RF transmitter 84 and T-R switch 82 are controlled by the controller 72 such that RF field pulses or signals are generated by the RF transmitter 84 and selectively applied to the patient for excitation of magnetic resonance in the patient.

Following application of the RF pulses, the T-R switch 82 is again actuated to decouple the RF coil assembly 66 from the RF transmitter 84. The detected MR signals are in turn communicated to the controller 72. The controller 72 includes a processor 88 that controls the processing of the MR signals to produce signals representative of an image of the patient. The processed signals representative of the image are also transmitted to the display device 80 to provide a visual display of the image. Specifically, the MR signals fill or form a k-space that is Fourier transformed to obtain a viewable image which may be viewed on the display device 80.

The imaging system 50 also controls the operation of PET imaging. Accordingly, in various embodiments, the imaging system 50 may also include a coincidence processor 90 that is coupled between the detector 12 and a PET scanner controller 92. The PET scanner controller 92 may be coupled to the controller 72 to enable the controller 72 to control the operation of the PET scanner controller 92. Optionally, the PET scanner controller 92 may be coupled to a workstation 94 which controls the operation of the PET scanner controller 92. In operation, the exemplary embodiment, the controller 72 and/or the workstation 94 controls real-time operation of the PET imaging portion of the imaging system 50.

More specifically, in operation, the signals output from the PET detector assembly 12 are input to the coincidence processor 90. In various embodiments, the coincidence processor 90 assembles information regarding each valid coincidence event into an event data packet that indicates when the event took place and the position of a detector that detected the event. The valid events may then be conveyed to the controller 92 and utilized to reconstruct an image. Moreover, it should be realized that images acquired from the MR imaging portion may be overlaid onto images acquired from the PET imaging portion. The controller 72 and/or the workstation 94 may a central processing unit (CPU) or computer 88 to operate various portions of the imaging system 50. As used herein, the term "computer" may include any processor-based or microprocessor-based system configured to execute the methods described herein. Accordingly, the controller 72 and/or the workstation 94 may transmit and/or receive information from the PET detector assembly 12 to both control the operation of the PET detector assembly 12 and to receive information from the PET detector assembly 12.

The various embodiments and/or components, for example, the modules, or components and controllers therein, such as of the imaging system 50, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
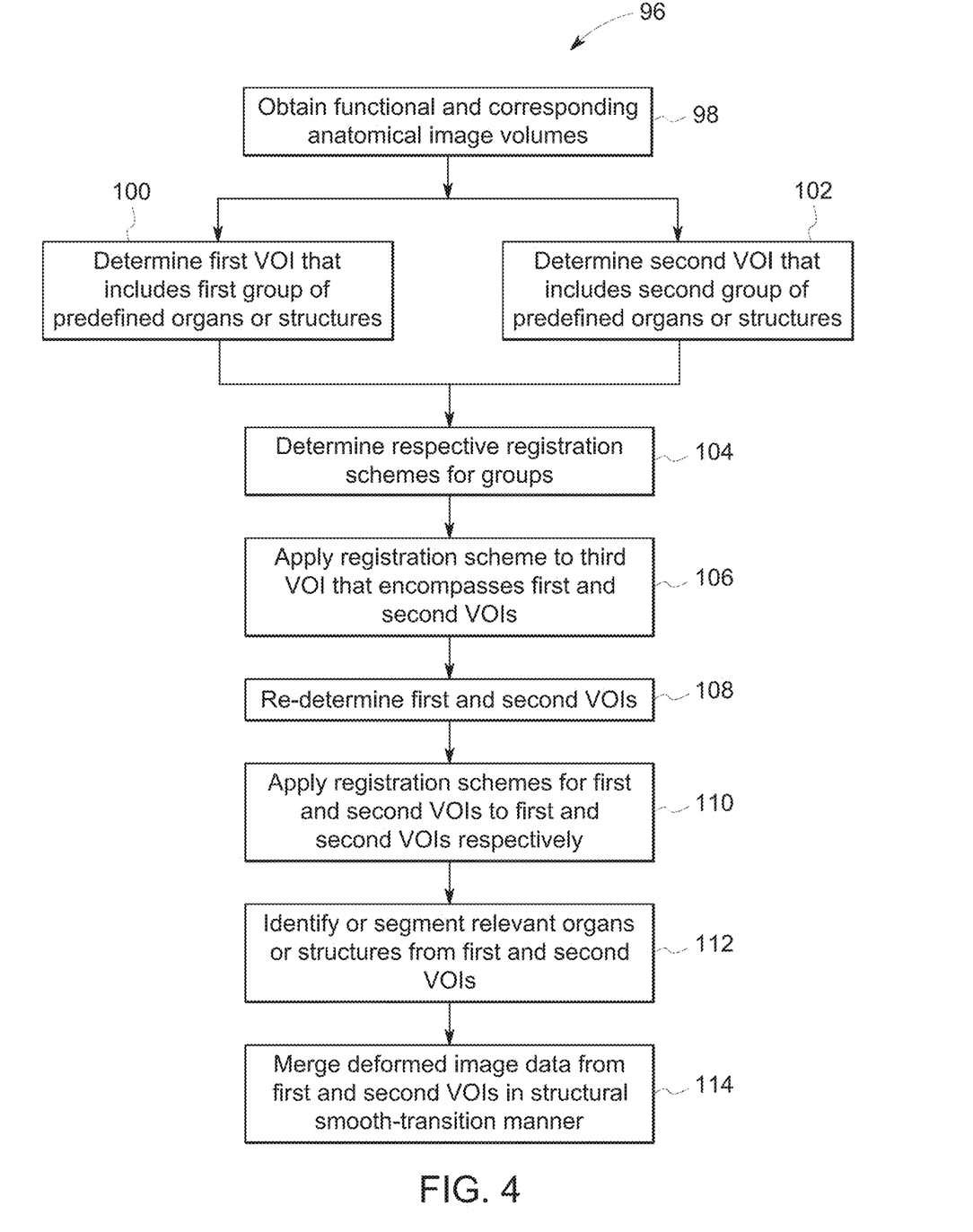
FIG. 4 is a flowchart of an embodiment of a method for performing image registration, in accordance with aspects of the present disclosure.

FIG. 4 is a flowchart of a method 96 for performing image registration (e.g., cohesive multi-regional functional-anatomical medical image registration). One or more steps of the method 96 may be performed by processing circuitry of the imaging systems discussed above or processing circuitry of a remote computing device having processing circuitry and memory circuitry. One or more of the steps of the method 96 may be performed simultaneously or in a different order from the order depicted in FIG. 4.

The method 96 includes obtaining or accessing a functional image volume (e.g., PET, SPECT) and a corresponding anatomical image volume (e.g., CT, MM) from a subject or patient from a medical imaging procedure (block 98). The image structures (e.g., organs, anatomical structures, etc.) may only be partially correlated. In addition, the image structures may include spatial misregistration. The method 96 also includes determining a first volume of interest (VOI) that includes a first group of predefined organs or anatomical structures from both the functional image volume and the corresponding anatomical image volume (block 100). The method 96 also includes determining a second VOI that includes a second group of predefined organs or anatomical structures from both the functional image volume and the corresponding anatomical image volume (block 102). It should be noted that any number of VOI associated with different groups of predefined organs or anatomical structures may be determined and utilized in the method 96. The predefined organs or anatomical structures may be different for the first and second groups. Examples of predefined organs or anatomical structures include heart (e.g., cardiac), liver, bone skeleton or bones, cancerous lung lesions, lung air volume, head, kidneys, arteries, lymph nodes, or any other organ or anatomical structure. The relevant organ or anatomical structures for the respective VOIs depend on the clinical requirements and applications (e.g., clinical review, diagnostics, etc.). The first VOI at least partially encompasses the second VOL In certain embodiments, the first VOI may completely encompass the second VOL In certain embodiments, the first VOI and the second VOI may be completely separate.

The method 96 further includes determining a first dedicated functional-anatomical registration scheme and a second dedicated functional-anatomical registration scheme for the first volume of interest and the second volume of interest based on the predefined organs or anatomical structures within the first volume of interest and the second volume of interest, respectively (block 104). In other words, each different group of predefined organs or anatomical structures are assigned a pre-defined or dedicated functional-anatomical registration scheme. For example, organs or anatomical structures that are not greatly impacted by motion (e.g., bones) may be assigned a more global registration scheme (e.g., global translation, global rotation, global scaling, or global 3D affine transformation), while organs or anatomical structures that are impacted by motion (e.g., heart or liver) may be assigned a more elastic registration scheme (e.g., local 3D affine transformation, 3D B-spline registration, or 'Demons' elastic registration). In certain embodiments, the pre-defined registration schemes may be different for the respective groups of relevant organs or structures. In certain embodiments, the pre-defined registration schemes may be the same for the respective groups of relevant organs or structures.

The method 96 even further includes applying a functional-anatomical registration scheme to a third VOI that encompasses both the first VOI and the second VOI to deform the third VOI (block 106). In certain embodiments, the functional-anatomical registration scheme for the third VOI may be a dedicated or pre-defined registration scheme for a third group of relevant predefined organs or structures. For example, a 3D translation registration scheme, or schemes that include global rotation or scaling, may be applied to the third VOI to correct for global motion. The functional anatomical registration scheme may be applied to the functional image volume, the corresponding anatomical image volume, or both the functional image volume and the anatomical image volume. It may be determined in advance whether it is the functional image volume, the corresponding anatomical image volume, or both the functional image volume and the anatomical image volume that is deformed. After deformation, the method 96 includes re-determining the first and second VOIs from the deformed third VOI (block 108).

The method 96 also includes applying both the first dedicated or predefined functional-anatomical registration scheme for the first group to the first VOI to deform the first VOI and a second dedicated or predefined functional-anatomical registration scheme for the second group to the second VOI to deform the second VOI (block 110). The respective dedicated or predefined functional-anatomical registration schemes may be applied to the functional image volume, the corresponding anatomical image volume, or both the functional image volume and the anatomical image volume. It may be determined in advance whether it is the functional image volume, the corresponding anatomical image volume, or both the functional image volume and the anatomical image volume that is deformed of the respective VOIs.

The method 96 further includes identifying or segmenting relevant organs or anatomical structures related to the first group and the second group in the first VOI and the second VOI, respectively (block 112). The respective identification or segmentation of relevant organs or anatomical structures in the first and second VOI may occur in the functional image volume, the corresponding anatomical image volume, or both the functional image volume and the anatomical image volume. It may be determined in advance whether it is the functional image volume, the corresponding anatomical image volume, or both the functional image volume and the anatomical image volume where the identification or segmentation may occur.

The method 96 still further includes merging the deformed image data from the first VOI and the second VOI in structural smooth-transition manner (e.g., to connect smoothly while preserving structure) (block 114). The merging may occur by keeping the pre-determined deformation constraints (as determined by the predefined registration schemes) on the identified or segmented relevant organs or anatomical structures related to the first group and the second group. In particular, a spatially smooth-transition weight mask may be generated that gives higher weight to image data corresponding to the identified or segmented relevant organs or anatomical structures related to the first group and the second group. A new image volume (e.g., final cohesive registered image) may be generated form the individually transformed sub-volumes.

Figure 5:
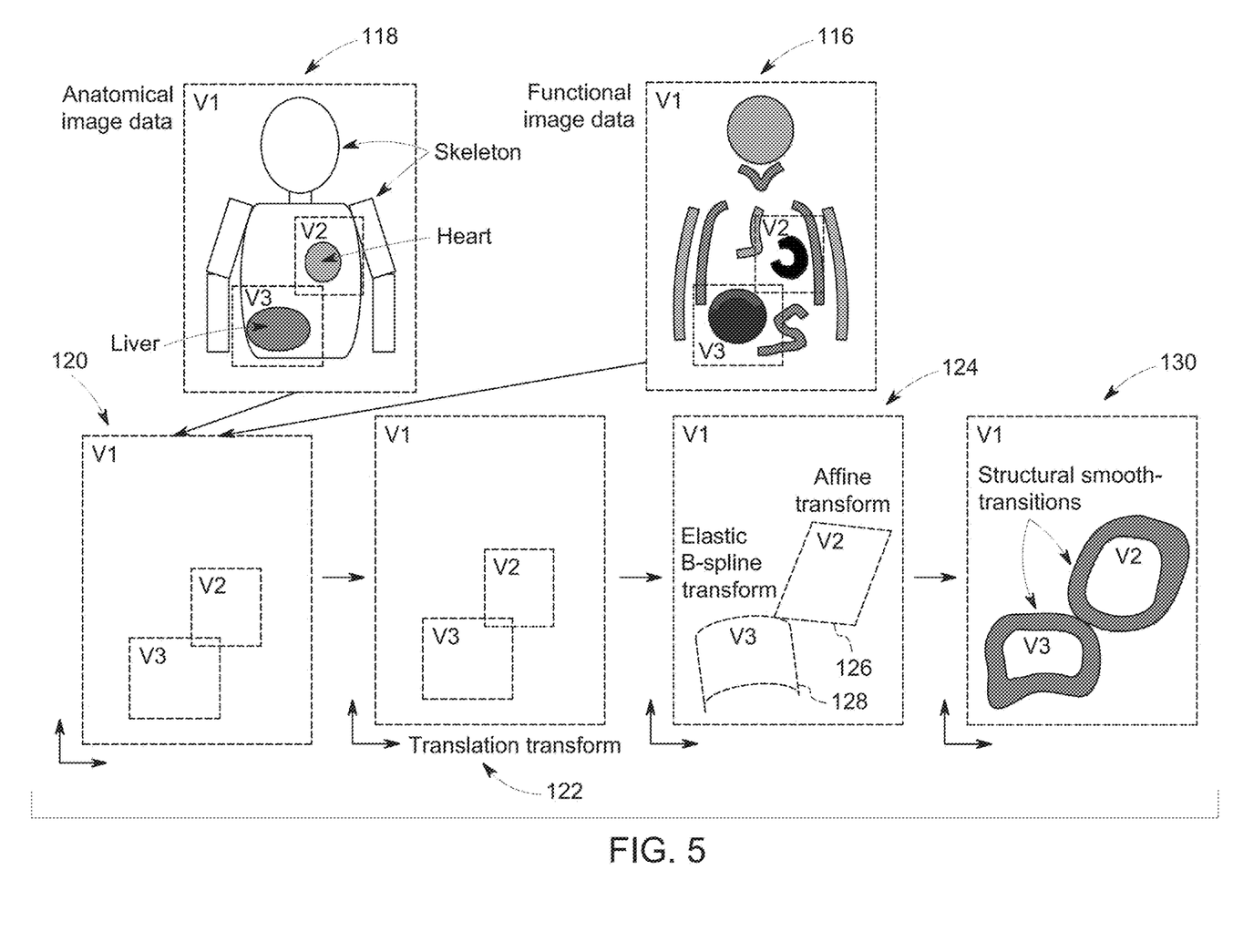
FIG. 5 is a schematic illustration of an embodiment for cohesive multi-regional functional-anatomical medical image registration, in accordance with aspects of the present disclosure.

FIG. 5 illustrates an example of cohesive multi-regional functional-anatomical medical image registration. As depicted, a pair of functional and anatomical image volumes 116, 118 are provided from a medical imaging procedure of a patient or subject. In certain embodiments, the image structures (e.g., organs, anatomical structures, etc.) may only be partially correlated. In addition, the image structures may include spatial misregistration. Based on the clinical procedure and purposes, several organs or anatomical structures are automatically identified. For example, the heart (cardiac), the liver, and the bone skeleton are identified in the functional and anatomical image volumes 116, 118 depicted in FIG. 5. Several corresponding VOIs are determined. In this example, V1, V2, and V3 are determined. The different volumes or sub-volumes may encompass others, may intersect, or may be separate. As depicted, V1 encompasses V2 and V3. In addition, V2 and V3 partially intersect. V1 includes the skeleton, heart, and liver. V2 includes the heart and the skeleton. V3 includes the liver and skeleton. The sub-volumes may be non-rectangular. A unique relevant registration scheme is pre-defined for each organ or anatomical structure (e.g., the skeleton, the heart, the liver). In the example, as a first step, 3D translation registration is applied on the 3 sub-volumes (V1, V2, and V3) collectively (e.g. to correct for global patient motion) (represented by schematic 120) to deform the 3 sub-volumes (as indicated in schematic 122). The similarity metric can be, for example, focused on the skeleton structures. The 3D translation registration may be applied to the functional image volume 116, the corresponding anatomical image volume 118, or both the functional image volume and the anatomical image volume 116, 118. It may be determined in advance whether it is the functional image volume 116, the corresponding anatomical image volume 118, or both the functional image volume and the anatomical image volume 116, 118 that is deformed.

At a second step, the cardiac sub-region passes a 3D affine registration and the liver sub-volume passes a 3D elastic B-spline registration (as indicated in the shift from schematic 122 to schematic 124) to transform V2 and V3, respectively. The 3D affine registration and the 3D elastic B-spline registration may each be applied to the functional image volume 116, the corresponding anatomical image volume 118, or both the functional image volume and the anatomical image volume 116, 118. It may be determined in advance whether it is the functional image volume 116, the corresponding anatomical image volume 118, or both the functional image volume and the anatomical image volume 116, 118 that is deformed. At the last step, the relevant anatomical structures are identified or segmented on the deformed volumes 126 (V2) and 128 (V3) and a smooth-transition merging is constructed (as shown in schematic 130) and applied to provide a final deformed volume. The structure identification or segmentation may be done on the functional image volume 116, the corresponding anatomical image volume 118, or both on the functional image volume and the anatomical image volume 116, 118. As noted above, the merging may occur by keeping the pre-determined deformation constraints (as determined by the predefined registration schemes) on the identified or segmented relevant organs or anatomical structures related to the respective groups. In particular, a spatially smooth-transition weight mask may be generated that gives higher weight to image data corresponding to the identified or segmented relevant organs or anatomical structures related to the specific groups.

Figure 6:
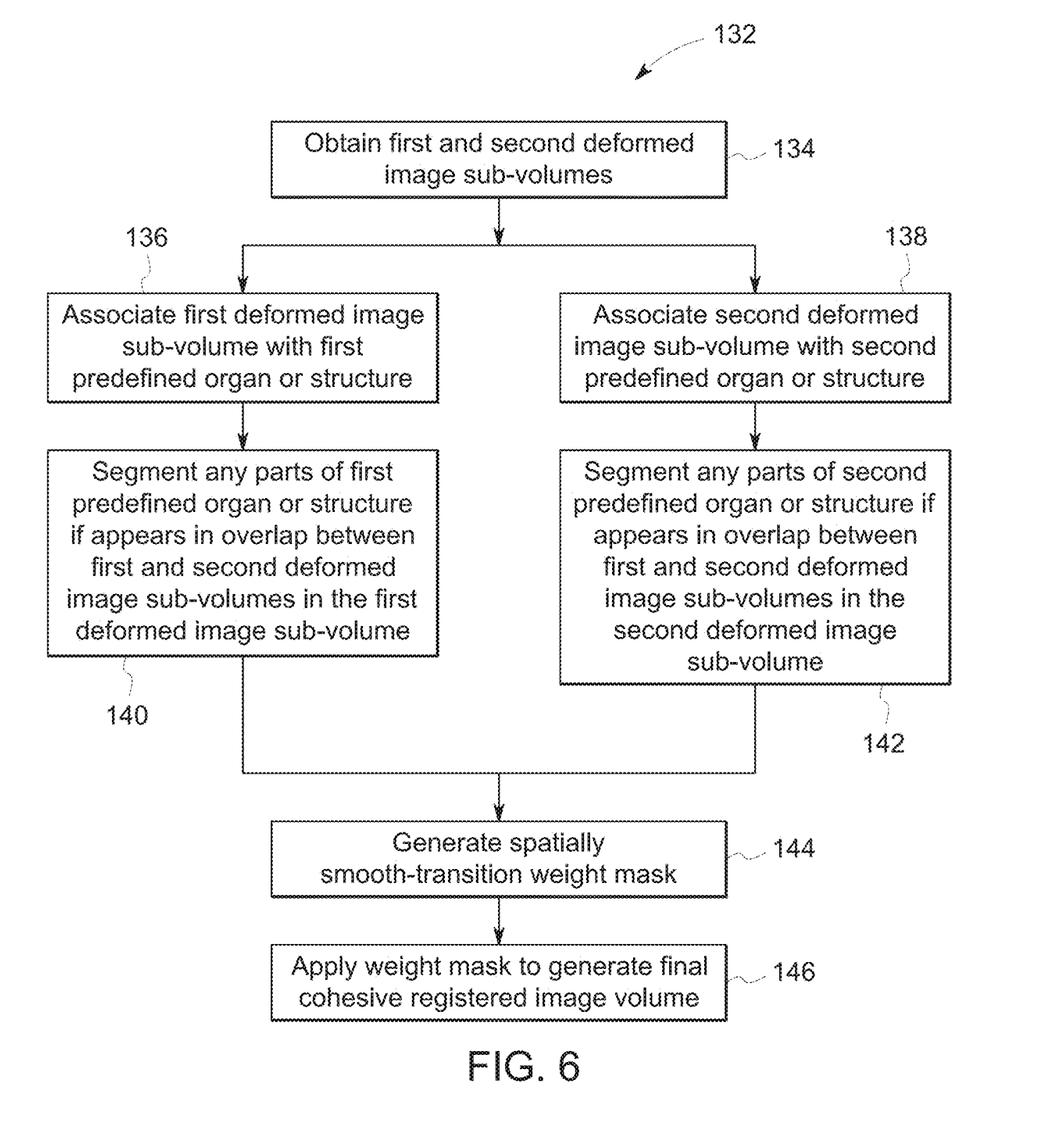
FIG. 6 is a flowchart of an embodiment of a method for generating a final cohesive registered image volume from individually transformed sub-volumes, in accordance with aspects of the present disclosure.

FIG. 6 is a flowchart of a method 132 for generating a final cohesive registered image volume from individually transformed sub-volumes. One or more steps of the method 132 may be performed by processing circuitry of the imaging systems discussed above or processing circuitry of a remote computing device having processing circuitry and memory circuitry. One or more of the steps of the method 32 may be performed simultaneously or in a different order from the order depicted in FIG. 6.

The method 132 includes obtaining or accessing a first deformed image data sub-volume and a second deformed image data sub-volume (block 134). The first deformed image data sub-volume spatially encompasses or intersects with the second sub-volume. The first and second deformed image data sub-volumes may be derived from a functional image volume (e.g., PET, SPECT) and/or a corresponding anatomical image volume (e.g., CT, MM) from a subject or patient obtained during a medical imaging procedure that has been subjected to functional-anatomical registration scheme.

The method 132 also includes associating the first deformed sub-volume with a first predefined organ or anatomical structure (block 136). The method 132 further includes associating the second deformed sub-volume with a second predefined organ or anatomical structure (e.g., different from the first predefined organ or anatomical structure) (block 138). Examples of predefined organs or anatomical structures include heart (e.g., cardiac), liver, bone skeleton or bones, cancerous lung lesions, lung air volume, head, kidneys, arteries, lymph nodes, or any other organ or anatomical structure.

The method 132 includes segmenting any part or parts of the first pre-defined organ or structure in the first deformed sub-volume if the part or parts appears in overlapping regions between the first and second deformed sub-volumes (block 140). The method 132 also includes segmenting any part or parts of the second pre-defined organ or structure in the second deformed sub-volume if the part or parts appears in overlapping regions between the first and second deformed sub-volumes (block 142). The segmentation of relevant organs or anatomical structures in the first and second deformed sub-volumes may occur in the functional image volume, the corresponding anatomical image volume, or both the functional image volume and the anatomical image volume. Prior to segmentation, one or more of the first or second organs or anatomical structures may be registered with a specific functional-anatomical registration scheme (i.e., specific to the organ or anatomical structure).

The method 132 further includes generating a spatially smooth-transition weight mask (e.g., merging weight mask) that gives higher weight to image data corresponding to the segmented organs or anatomical structures from blocks 140 and 142 (block 144). The spatially smooth-transition weight mask keeps pre-determined deformation constraints on the segmented relevant organs or anatomical structures. In addition, the spatially smooth-transition weight mask gives an intermediate weight to image data located between regions corresponding to the segmented relevant organs or anatomical structures from blocks 140 and 142. The mask keeps the pre-determined deformation constraints on the segmented relevant organs or anatomical structures related to their respective groups. The method 132 still further includes applying the spatially smooth-transition weight mask to the image data to generate a final cohesive registered image volume based on the weighted image data (block 146).

Figure 7:
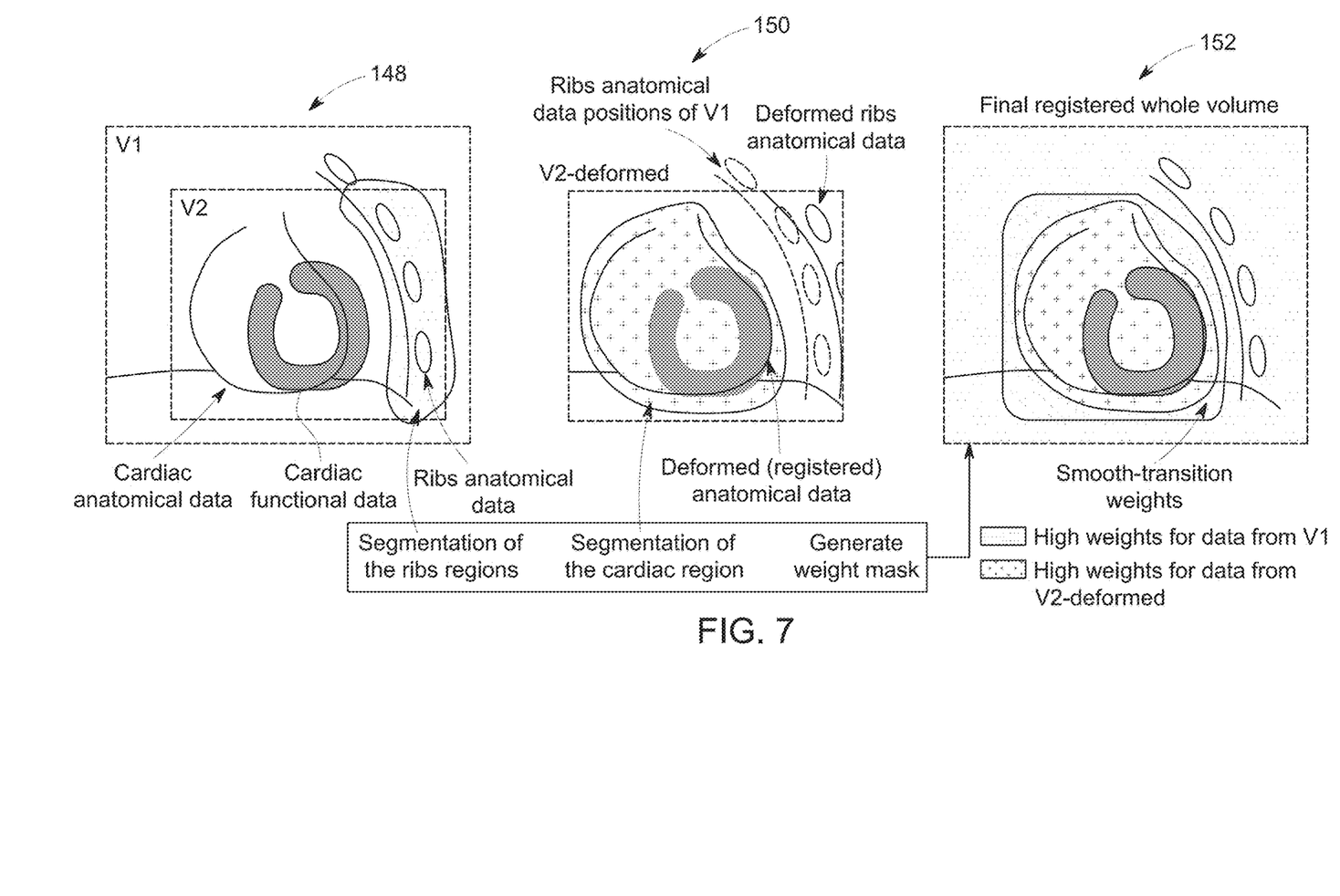
FIG. 7 is a schematic illustration of an embodiment for generating a final cohesive registered image volume based on different region transformation and a merging weight map, in accordance with aspects of the present disclosure.

FIG. 7 illustrates an example for generating a final cohesive registered image volume based on different region transformation and a merging weight map. The schematic 148 illustrates a first sub-volume (V1) and a second sub-volume (V2) derived from both anatomical and functional image data that have been subject to registration. The sub-volume V2 is included within the larger sub-volume V1. V2 is focused on the heart and its close vicinity. Ribs are located in both sub-volumes V1 and V2. As seen in the schematic 148, the functional and anatomical image data of the myocardium are misregistered (e.g., due to cardiac motion and the different timing of the two modality scans). A specified registration scheme (e.g., as pre-defined for cardiac or heart image data) is applied on sub-volume V2 to deform it to improve the registration on the myocardium data as depicted in schematic 150. Part of the rib structures which are included in sub-volume V2 are non-optimally deformed due to the very low functional data appearance on these structures. To address this issue, a segmentation algorithm is applied on the rib structures of sub-volume V1 in schematic 148 and another segmentation is applied on the cardiac structure in sub-volume V2 in schematic 150. Typically, even rough segmentation can be sufficient. A combined weight mask is generated with smooth transition properties to generate the cohesive registered volume. For example, any other tissue structures in between the segments such as the lung parenchyma will receive partial weights (e.g., smooth-transition or intermediate weights) from the two sub-volumes V1 and V2, which lead to the average preserving of this anatomical structure. The mask gives higher weights to image data corresponding to the segmented organs or anatomical structures (e.g., ribs and cardiac region). In certain embodiments, the smooth-transition mask can be constructed on any interface regions between the sub-volumes, even independently of the segmented structures. Application of the weighted mask generates a final cohesive registered image volume as seen in schematic 152.

Figure 8:
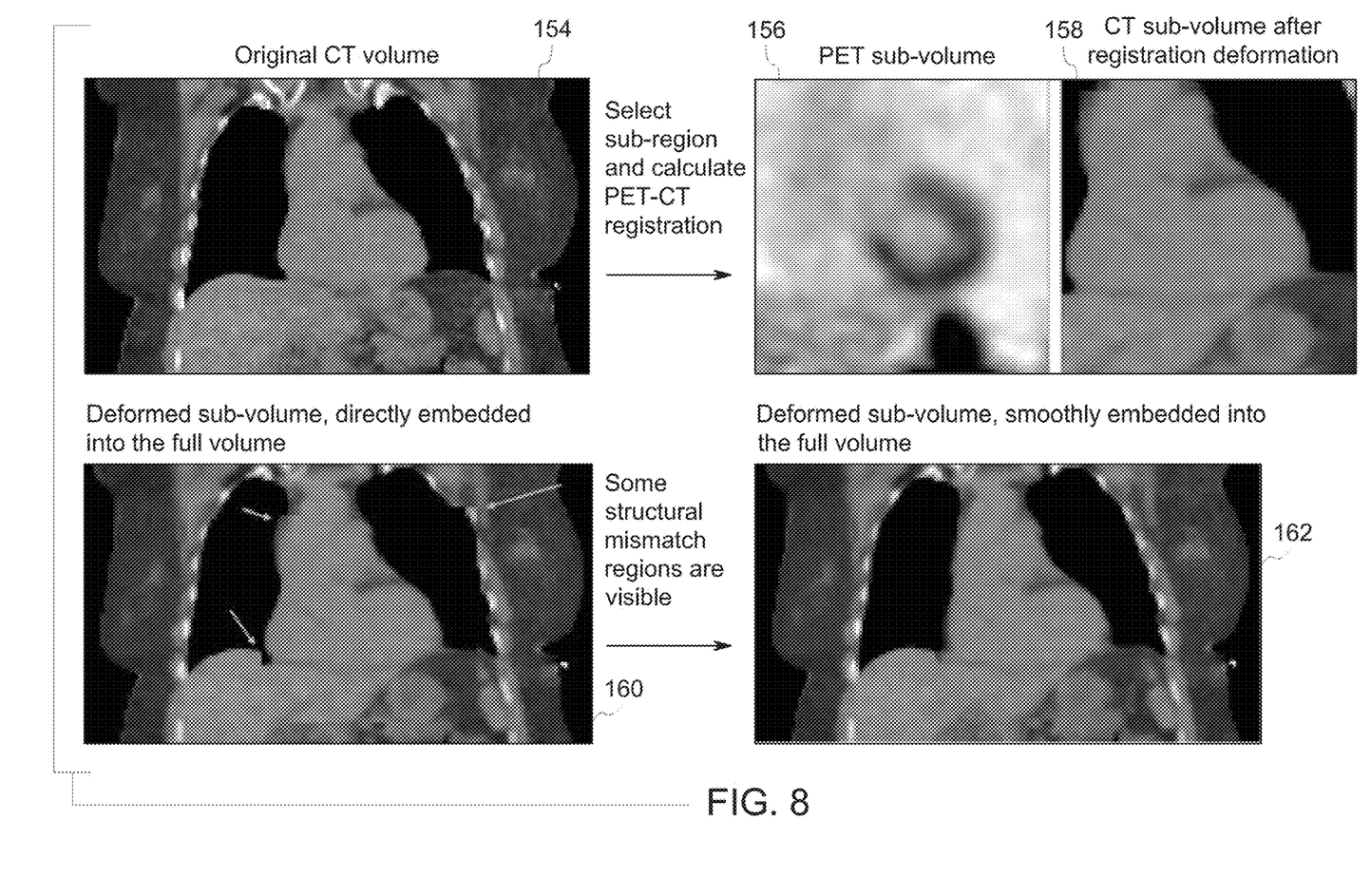
FIG. 8 is a series of images illustrating the generation of a final cohesive registered image volume from a cardiac PET-CT imaging procedure, in accordance with aspects of the present disclosure.

FIG. 8 is a series of images illustrating the generation of a final cohesive registered image volume from a cardiac PET-CT imaging procedure utilizing a scheme similar to that described in FIG. 7. Image 154 represents the original CT volume of a cardiac region surround by a rib region. Image 156 represents a PET sub-volume that includes the cardiac region. Due to the cardiac and respiratory motions, the PET and CT image volumes are misregistered. A sub-region around the heart is automatically detected. First, the whole imaged volume (image 154) is registered by a 3D translation scheme. Then, the sub-region around the heart is registered by a 3D affine scheme (e.g., between the image 156 and the image 154 after application of the 3D translation scheme) resulting in the deformed sub-volume around the heart as represented by image 158. It can be seen in image 160 that a simple merging of the two deformed CT volumes will result in some unrealistic discontinuation of organ structures. Therefore, an automatic algorithm detects the relevant anatomical structures and generates a smooth-transition merging (via a spatially smooth-transition mask as described above) of the inner sub-volume (seen in image 158) with the full volume (deformed via the 3D translation scheme) to generate a final cohesive registered image volume as represented by image 162. This example is mainly intended for the first step in iterating attenuation-corrected reconstruction.

Figure 9:
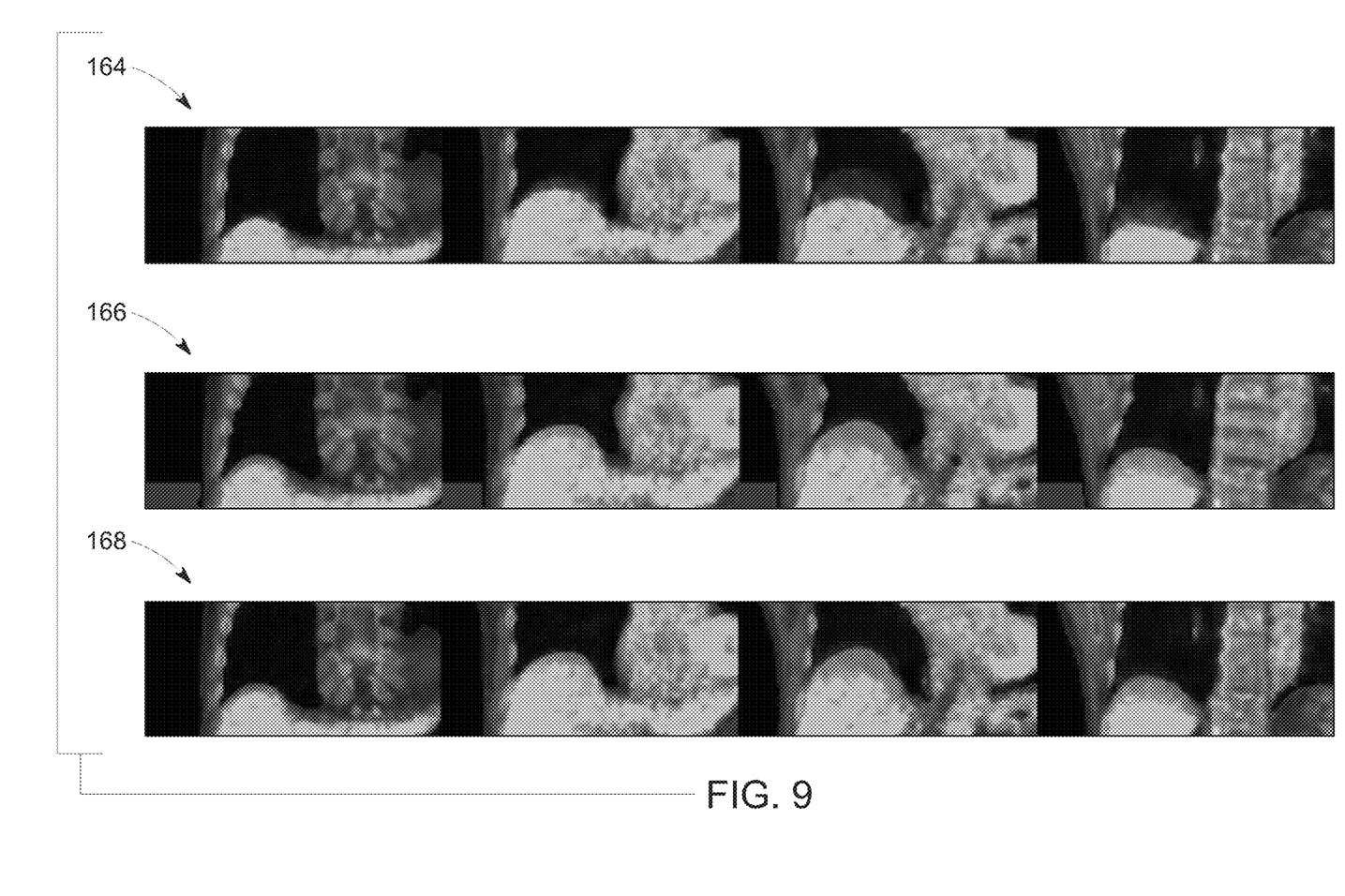
FIG. 9 is a series of images illustrating the generation of a final cohesive registered image volume from a whole body PET-CT imaging procedure, in accordance with aspects of the present disclosure.

FIG. 9 is a series of images illustrating the generation of a final cohesive registered image volume from a whole-body PET-CT imaging procedure utilizing the techniques described above. A top row 164 of images represent 4 coronal slices of fused original PET-CT image volumes with a selected sub-region the area surrounding the liver. Due to respiratory motion, the liver functional and anatomical data are highly misregistered. A sub-volume around the liver is detected automatically and a 3D fully elastic B-spline registration is performed. A middle row 166 of images represents the deformed CT volume. The CT sub-volume is deformed accordingly but due to the low activity in the bones and lack of structural information on the PET image data, the resultant bone structures are not optimal (i.e., the ribs and spine suffer from unrealistic deformation). Therefore, an automatic algorithm detects the relevant anatomical structures and generates a smooth-transition merging of the liver with the original bone structures. The results of the structural-based smooth merging of the relevant CT organ structures are shown in the bottom row 168 of images. This example is mainly intended for the first step in iterating attenuation-corrected reconstruction.

As described above, the merging weight mask is mostly based on regional segmentation of the relevant organs and structures. In certain embodiments, the merging weight mask may be generated from a local weight distribution dependent on the average mutual-information metric (or another similarity metric) in local regions, where the average mutual-information metric may be good or bad (i.e., having a high or poor structural correlation). In this scenario, the measured spatially average correlation should be repeated after the registration deformation process.

An additional application of the disclosed techniques may be utilized to assist clinical reviewing and diagnostics. For example, dynamically (via an user interface or another reviewing tool) bring the original CT images to be locally quasi-registered to the SPECT or PET images by moving the original diagnostic image based on the previously calculated deformation filed (e.g., a fully elastic deformation field). This will maintain the diagnostic quality of the original CT images.

Technical effects of the disclosed embodiments include providing systems and methods for performing cohesive multi-regional functional anatomical medical image registration. In particular, the disclosed embodiments improve spatial image registration tasks between functional and medical imaging modalities (e.g., SPECT-CT, PET-CT, etc.). The disclosed techniques provide a final cohesive registered image volume derived from merging deformed sub-volumes (e.g., via an algorithm) in a smooth-transition manner (e.g., utilizing a spatially smooth-transition weight mask) that provides cohesively deformed regions with preserved deformation constraints and structural characteristics. The disclosed embodiments enable the preservation of a realistic appearance of the various anatomy and improves overall image registration accuracy.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for performing image registration, comprising:
   obtaining, via a processor, a functional image volume and a corresponding anatomical image volume from a subject;
   determining, via the processor, both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest;
   prior to applying both a first dedicated functional-anatomical registration scheme and a second dedicated functional-anatomical registration scheme, applying, via the processor, a third dedicated functional-anatomical registration scheme to a third volume of interest that encompasses both the first volume of interest and the second volume of interest to deform the third volume of interest;
   applying, via the processor, both the first dedicated functional-anatomical registration scheme to the first volume of interest to deform the first volume of interest and the second dedicated functional-anatomical registration scheme to the second volume of interest to deform the second volume of interest;
   identifying or segmenting, via the processor, relevant organs or anatomical structures related to the first group and the second group in the first deformed volume of interest and the second deformed volume of interest, respectively;
   generating, via the processor, a spatially smooth-transition weight mask that gives higher weight to image data corresponding to the identified or segmented relevant organs or anatomical structures related to the first group and the second group; and
   generating, via the processor, a final cohesive registered image volume from the first deformed image volume of interest and the second deformed image volume of interest utilizing the spatially smooth-transition weight mask.

2. The computer-implemented method of claim 1, wherein the spatially smooth-transition weight mask keeps pre-determined deformation constraints on the identified or segmented relevant organs or anatomical structures related to the first group and the second group.

3. The computer-implemented method of claim 1, wherein the spatially smooth-transition weight mask gives an intermediate weight to image data located between regions corresponding to the identified or segmented relevant organs or anatomical structures related to the first group and the second group.

4. The computer-implemented method of claim 1, comprising redetermining, via the processor, the first volume of interest and the second volume of interest from the deformed third volume of interest prior to applying the first and second functional-anatomical registration schemes.

5. The computer-implemented method of claim 1, wherein the third functional-anatomical registration scheme is applied to the functional image volume, the corresponding anatomical image volume, or both the functional image volume and the anatomical image volume.

6. The computer-implemented method of claim 1, wherein the first dedicated functional-anatomical registration scheme is applied to the functional image volume, the corresponding anatomical image volume, or both the functional image volume and the anatomical image volume.

7. The computer-implemented method of claim 1, wherein the second dedicated functional-anatomical registration scheme is applied to the functional image volume, the corresponding anatomical image volume, or both the functional image volume and the anatomical image volume.

8. The computer-implemented method of claim 1, wherein the identified or segmented relevant organs or anatomical structures related to the first group and the second group are obtained in the functional image volume, the corresponding anatomical image volume, or both the functional image volume and the corresponding anatomical image volume.

9. The computer-implemented method of claim 1, comprising determining the first dedicated functional-anatomical registration scheme and the second dedicated functional-anatomical registration scheme for the first volume of interest and the second volume of interest based on the predefined organs or anatomical structures within the first volume of interest and the second volume of interest.

10. A system for cohesive multi-regional functional-anatomical medical image registration, comprising:
a memory encoding processor-executable routines;
a processor configured to access the memory and to execute the processor-executable routines, wherein the routines, when executed by the processor, cause the processor to:
obtain a functional image volume and a corresponding anatomical image volume from a subject;
determine both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest;
prior to applying both a first functional-anatomical registration scheme and a second functional-anatomical registration scheme, apply a third dedicated functional-anatomical registration scheme to a third volume of interest that encompasses both the first volume of interest and the second volume of interest to deform the third volume of interest;
apply both the first dedicated functional-anatomical registration scheme to the first volume of interest to deform the first volume of interest and the second dedicated functional-anatomical registration scheme to the second volume of interest to deform the second volume of interest;
identify or segment relevant organs or anatomical structures related to the first group and the second group in the first deformed volume of interest and the second deformed volume of interest, respectively;
generate a spatially smooth-transition weight mask that gives higher weight to image data corresponding to the identified or segmented relevant organs or anatomical structures related to the first group and the second group; and
generate a final cohesive registered image volume from the first deformed image volume of interest and the second deformed image volume of interest utilizing the spatially smooth-transition weight mask.

11. The system of claim 10, wherein the spatially smooth-transition weight mask keeps pre-determined deformation constraints on the identified or segmented relevant organs or anatomical structures related to the first group and the second group.

12. The system of claim 10, wherein the spatially smooth-transition weight mask gives an intermediate weight to image data located between regions corresponding to the identified or segmented relevant organs or anatomical structures related to the first group and the second group.

13. The system of claim 10, wherein the routines, when executed by the processor, cause the processor to re-determine the first volume of interest and the second volume of interest from the deformed third volume of interest prior to applying the first and second functional-anatomical registration schemes.

14. The system of claim 10, wherein the routines, when executed by the processor, cause the processor to determine the first dedicated functional-anatomical registration scheme and the second dedicated functional-anatomical registration scheme for the first volume of interest and the second volume of interest based on the predefined organs or anatomical structures within the first volume of interest and the second volume of interest.

15. A non-transitory computer-readable medium, the computer-readable medium comprising processor-executable code that when executed by a processor, causes the processor to:
obtain a functional image volume and a corresponding anatomical image volume from a subject;
determine both a first volume of interest that includes a first group of predefined organs or anatomical structures and a second volume of interest that includes a second group of predefined organs or anatomical structures different from the first group from both the functional image volume and the corresponding anatomical image volume, wherein the first volume of interest at least partially encompasses the second volume of interest;
prior to applying both a first functional-anatomical registration scheme and a second functional-anatomical registration scheme, apply a third dedicated functional-anatomical registration scheme to a third volume of interest that encompasses both the first volume of interest and the second volume of interest to deform the third volume of interest;
apply both the first dedicated functional-anatomical registration scheme to the first volume of interest to deform the first volume of interest and the second dedicated functional-anatomical registration scheme to the second volume of interest to deform the second volume of interest;
identify or segment relevant organs or anatomical structures related to the first group and the second group in the first deformed volume of interest and the second deformed volume of interest, respectively;
generate a spatially smooth-transition weight mask that gives higher weight to image data corresponding to the identified or segmented relevant organs or anatomical structures related to the first group and the second group; and
generate a final cohesive registered image volume from the first deformed image volume of interest and the second deformed image volume of interest utilizing the spatially smooth-transition weight mask.

16. The non-transitory computer-readable medium of claim 15, wherein the spatially smooth-transition weight mask keeps pre-determined deformation constraints on the identified or segmented relevant organs or anatomical structures related to the first group and the second group.

17. The non-transitory computer-readable medium of claim 15, wherein the spatially smooth-transition weight mask gives an intermediate weight to image data located between regions corresponding to the identified or segmented relevant organs or anatomical structures related to the first group and the second group.

18. The non-transitory computer-readable medium of claim 15, wherein the processor-executable code, when executed by the processor, cause the processor to determine the first dedicated functional-anatomical registration scheme and the second dedicated functional-anatomical registration scheme for the first volume of interest and the second volume of interest based on the predefined organs or anatomical structures within the first volume of interest and the second volume of interest.

* * * * *